United States Patent [19]

Hartmeister

[11] 4,272,888
[45] Jun. 16, 1981

[54] PARALLEL ACTION CUTTING HAND TOOL

[76] Inventor: Ruben J. Hartmeister, 1034 6th St., Golden, Colo. 80401

[21] Appl. No.: 104,185

[22] Filed: Dec. 17, 1979

[51] Int. Cl.³ ............................................. B26B 13/00
[52] U.S. Cl. ........................................ 30/229; 30/233
[58] Field of Search ................ 30/178, 179, 229, 233, 30/241, 242

[56] References Cited

U.S. PATENT DOCUMENTS

| | | | |
|---|---|---|---|
| 1,002,710 | 9/1911 | Kurzman | 30/229 |
| 1,179,830 | 4/1916 | Hayes | 30/178 X |
| 2,751,681 | 6/1956 | Hillson | 30/229 |
| 4,106,195 | 8/1978 | Berg | 30/229 |

*Primary Examiner*—Jimmy C. Peters
*Attorney, Agent, or Firm*—Kyle W. Rost

[57] ABSTRACT

Cutting dies are mounted for parallel movement in a scissors-action handle assembly employing pivot pins mounted both forward and rearward of the pivot axis of the handles, and one of the engagement openings for a pivot pin in each die is longitudinally extended for necessary clearance. The cutting edges of the two dies are at one longitudinal end of the tool extending beyond the portion of the dies between the two pivot pins. Parallel action is guided by a pair of guide pins longitudinally spaced and to the maximum extend possible located in the plane of the die cutting edges. A compression spring is centrally located between the guide pins to bias the dies to open position. When the dies are of the kind adapted to trim venetian blind slat ends, one die aligns the blind slat by transverse ribs to the cutting edge. The corners between the cut edge and the transverse edges of the slat are cosmetically blended for visual acceptability through provision for a small tangent angle at the union of the corner and the transverse edge.

9 Claims, 5 Drawing Figures

PARALLEL ACTION CUTTING HAND TOOL

BACKGROUND OF THE INVENTION

1. Field of the Invention

The invention relates to tools and in particular to parallel action pivot handled tools. More specifically, the invention relates to cutting tools employing male and female dies, especially to hand operated cutting tools adapted to trim sheet materials such as venetian blind slats.

2. Description of the Prior Art

Parallel action pivoted hand tools are well known in the art in the form of parallel jaw pliers, which are widely available. U.S. Pat. Nos. 168,924 and 188,262 to Russell disclose the relevant structure in substantially the same form in which it is currently practiced.

Venetian blind trimmers are a commonly used installer's tool, used to adapt a premanufactured blind to the specific requirements of an opening. Often each slat of a blind must be trimmed at one end. For this purpose, male and female dies are attached to the jaws of a scissors action hand tool similar to a tin snip, and a depth guage is connected to one of the dies to provide a uniform depth-of-cut measurement for evenly modifying the length of any number of slats. The typical scissors action venetian blind trimmer brings the male and female dies together with a variable shear so that a slat is trimmed progressively from one edge to the other as the pivoted handles are closed. An ordinary shear cannot be used for this trimming operation because the end edge of a venetian blind slat is smoothly curved at each corner for transition to the forward and rearward edges of the slat, and this curve must be preserved for cosmetic uniformity among slats of a single blind.

The seemingly straight-forward task of trimming venetian blind slats with acceptable cosmetic uniformity presents several problems. First, the slats are slightly bowed from front to rear and tend to flatten under the pressure of a cutting tool, presenting an alignment problem between the edges of the slats and the corner curves on the cutting dies. Second, the slats are constructed from thin sheet material such as aluminum, and hence the edges are easily subject to burring if the clearance between male and female dies is excessive. The latter presents a recurrent problem with scissors-action trimmers since alignment between the dies is controlled only at the single pivot point between the shear handles. If either burring or uneven corner curves should result from a trimming operation, it is necessary to retrim, potentially producing unevenness among slat lengths, or to replace the ill-trimmed slat. For this reason it is highly desirable that a trimmer be accurate and consistent in its operation.

The present invention provides a solution to the problems of scissors-action venetian blind trimmers and correspondingly offers an improvement in parallel action jaw tools, especially those employing cooperating cutting edges.

SUMMARY OF THE INVENTION

A parallel jaw die cutting tool is provided with a parallel-action handle of known configuration and a pair of dies operated by the handle. Accuracy and consistency of cut are achieved by a pair of guide pins spaced at approximately the maximum longitudinal distance available in the dies, with a compression spring located near the midpoint between the springs to bias the dies toward open position. The pins and spring are aligned with the cutting edge of the dies. The portions of the two dies not directly involved in cutting have opposed parallel faces that abut when the dies are closed, but at least one die has a shear angle along its cutting edge relative to the parallel face. For trimming venetian blind slats, one of the dies, especially a die without a shear angle on its cutting face, is provided with a guide surface to align the slat with the cutting edges, and the guide surface may include a pair of retaining edges for abutting one or both edges of the slat. The cutting edges of the dies terminate in smooth curves to blend the corners of the trimmed slat with the slat edges abutting the retaining edges of the guide surface, and these corners meet the abutment line of the retaining edges with a small tangent angle such as five degrees.

The object of the invention is to create a parallel-action die cutting hand tool that produces consistently unifrom cuts while avoiding binding between the pair of cutting dies.

Another object is to create an imporved trimmer for venetian blind slats that takes into account minor dimensional variation in the width of slats and variations in the degree to which different slats will flatten during a die cutting operation.

DESCRIPTION OF THE PREFERRED EMBODIMENT

Figure 1:
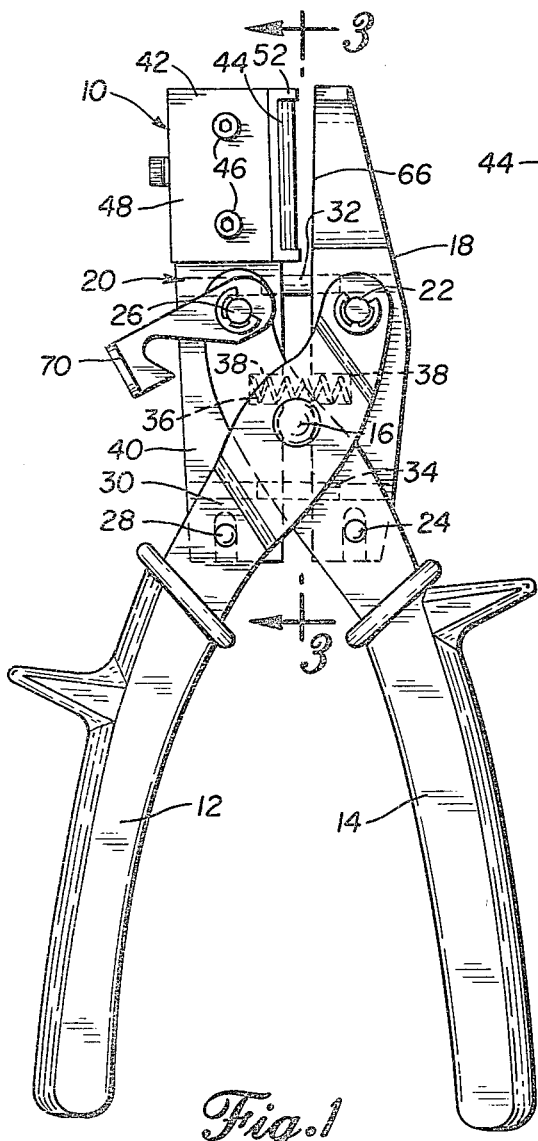
FIG. 1 is a left side elevational view of the trimmer.

A hand operated parallel action tool 10, best shown in FIG. 1, is constructed from a scissors-action assembly of the type known in the art to include first handle lever 12 and second handle lever 14 joined together and hinged on a main pivot pin 16. The rearward portions of handle levers 12 and 14, at the lower end of FIG. 1, constitute hand engageable grips. Parallel action jaws are attached to the forward portions of the levers 12 and 14, at the upper end of FIG. 1. These jaws may be cutting dies, especially those adapted for trimming venetian blind slats.

The jaws or dies may be distinct in character, such as first or upper die 18 and second or lower die 20. Parallel action between the dies is achieved by the known mechanism of mounting each die to the handle assembly by two pivot pins, one located forward of the main pivot pin by a predetermined distance and one rearward of the pin by an equal distance. For example, die 18 is connected to handle lever 12 by pin 22 forward of main pin 16, and this die is connected to handle lever 14 rearward of the main pin by pivot pin 24. Correspondingly, lower die 20 is connectd to lever 14 forwardly of the main pin by pivot pin 26 and is connected rearwardly of the main pin to lever 12 by pivot pin 28. As the handle levers 12 and 14 are pivoted together in scissors-action on main pin 16, the forward and rearward pivot pins also move respectively together to guide the dies in parallel action The pins 22, 24, 26, and 28 also move in small arcs about the main pin, slightly changing the longitudinal or front-to-rear distance between pins connected to a single die. Therefore, only one of the pins through each die is permitted to have a relatively fixed longitudinal position with respect to the die. In the embodiment of FIG. 1, the dies 18 and 20 each have a longitudinal rear slot 30 receiving, respectively, pivot pins 24 and 28 to provide the necessary longitudinal clearance. The dies are appropriately contoured to provide necessary clearance with main pin 16 when the handle assembly is closed to the maximum extent.

Figure 2:
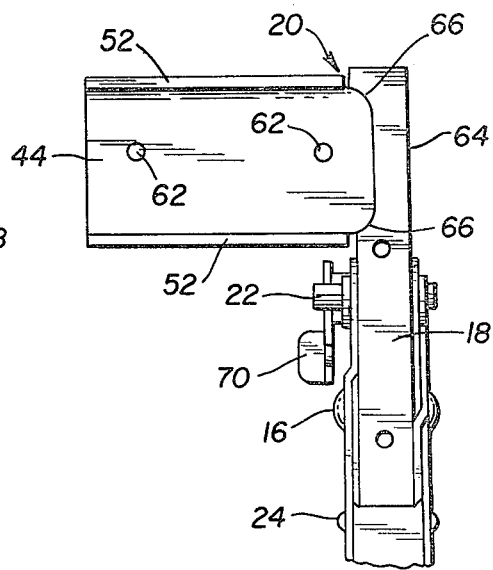
FIG. 2 is a top plan view of the forward portion of the trimmer.
Figure 3:
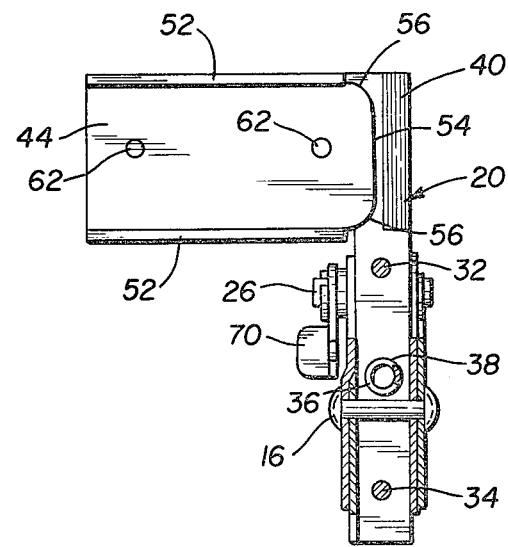
FIG. 3 is a cross-sectional view taken along the plane of line 3—3 of FIG. 1.

To the extent that the tool might be used as a plier, the jaws are satisfactorily aligned for parallel closure as described above. However, for accurate and consistent operation of the jaws as cutting dies, improved lateral stability, or stability of alignment from right to left in FIGS. 2 and 3, is desired. For this purpose, a front guide pin 32 and a rear guide pin 34 are each mounted in one of the dies and slidably received in a bore of the other die. The pins 32 and 34 are mutually parallel, lie in the plane of die movement relative to the tool as a whole, and are parallel with the direction of die movement in that plane. To the extent possible, the pins lie in a longitudinally extending plane intersecting the cutting edges of the two dies. The guide pins are longitudinally spaced by the maximum practical available distance, with the rear pin 34 being mounted immediately in front of slots 30 and the front pin 32 being mounted immediately to the rear of the die cutting edges. Close to the midpoint between pins 32 and 34 is resilient compression spring 26, parallel to the pins and retained in recesses 38 in the two die halves, which recesses are immediately forward of the main pivot pin 16. The spring provides a biasing force that opens the tool jaws and prevents binding that might result through misalignment between the pins 32, 34 and the bores in which they are slidably received.

Figure 5:
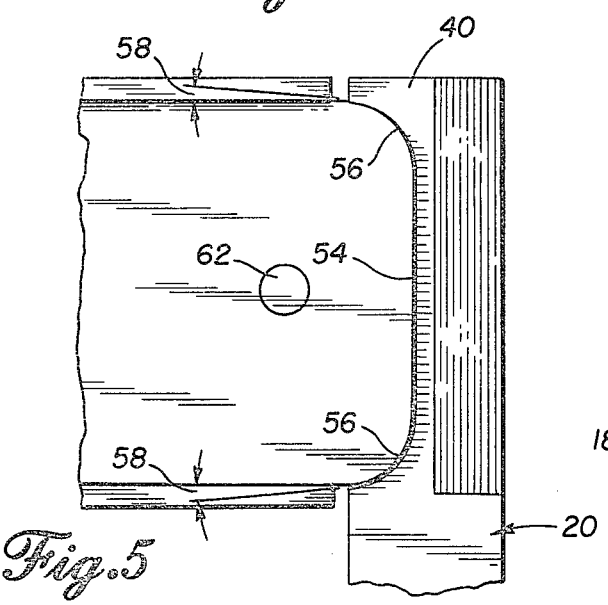
FIG. 5 is an enlarged top view of the cutting dies.
Figure 4:
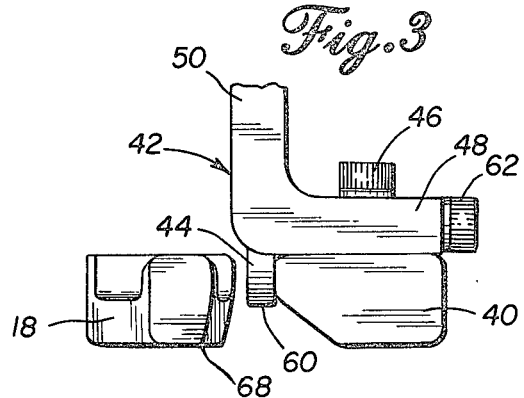
FIG. 4 is a partial front view of the trimmer.

The specific configuration of the dies 18 and 20 illustrated in the drawings is for an embodiment of the tool for trimming venetian blind slats. Die 20 is constructed from a die base 40, a flat angle support 42, and a die plate 44. The base is directly connected to the handle assembly as previously described and carries the angle support and die plate. In addition, base 40 may carry the front and rear guide pins 32 and 34, for example by a press fit into suitable holes formed in the base. Angle support 42 is carried on one side of the base, for example the left side as shown in the drawings, with attachment by means of removeable fasteners such as cap screws 46 threaded through the lower flange 48 of the angle support and into the base. The laterally extending upper flange 50 is bounded on its front and rear upper edges by ribs 52 defining retaining edges spaced apart by the intended width of the venetian blind slats to be trimmed by the tool. For example, if the slat width is one inch, the distance between the inner edges of the two ribs 52 will also be one inch; however, it should be understood that the typical slat is bowed in the direction of its width, resulting in the slat being slightly less than one inch when in bowed configuration. The retaining edges anticipate in their spacing that the slat will be at least locally flattened during the trimming process. Die plate 44 is carried by the angle support between ribs 52 while permitting at least a portion of the ribs to protrude upwardly above the top of the die plate. The righthand edge 54 of the die plate protrudes from between the ribs 52 over the top of base 40, as best shown in FIG. 3, and this edge is completed by curved corners 56 that meet ribs 52 at tangent angle 58, FIG. 5, of between three and seven degrees, with a tangent angle of five degrees being preferred. Edge 54 and corners 56 define the cutting edge of the lower die, and the side face 60, FIG. 4, depending from the cutting edge is beveled inwardly at a small angle such as one degree. The entire die plate 44 is attached to the upper flange of the flat angle support 42 by removeable fasteners 62, permitting the die plate to be removed for regrinding and repositioned for continued close tolerance operation.

The upper die 18 substantially overlies base 40 as can best be understood by a comparison of FIGS. 2 and 3. The forward end of the upper die is formed into a cooperating die surface 64 that is substantially identical in contour to lower die edge 54, and the upper die surface 64 is curved at each longitudinal end with a smooth radius corresponding to curves 56, terminating with the same tangent angle used in curves 56. The opposed surfaces of base 40 and die 18 between front guide pin 32 and the rear of the two dies are substantially parallel to each other and to the longitudinal axis of the tool 10. These two surfaces come into flush abutment when the dies are in maximum closed position, maintaining the parallelism of the tool. However, the forward portion 66 of die 18, from approximately the front side of pin 32 to the forward tip of the tool, is at a shear angle to the longitudinal axis of the tool, with the result that the cutting edge of die 18 progressively passes the cutting edge of die 20 from the rear of the edge to the front thereof as the tool is closed. The shear angle is constant throughout the closure of the dies. The lower face of die 18 through the length of portion 66 has a lateral upward rake from cutting edge to the opposite lower edge 68. A clip 70 holds the dies in closed position when the tool is not in use.

The operation of the tool to trim venetian blind slats involves placement of a slat on the die plate 44 with the convex side of the slat curve facing upwardly so that the slat edges are against the die plate, preferably with the rear slat edge against the rear retaining edge of the flat angle support. The slat is then laterally positioned to bring the desired mark where the cut is to be made under edge 64 of the upper cutting die. Closing the tool handle then moves the dies together, progressively cutting the slat from rear edge to front edge and forming uniform curved corners in the process.

As the dies close, the slat is temporarily flattened, ideally, to fill the entire front-to-rear length between the retaining edges of the flat angle support. However, small variations may exist between slat widths so that not every slat will perfectly fill the space between the retaining edges, and not every slat will flatten perfectly during the trimming process. For this reason, the small tangent angle at corners 56 and 66 is important to the cosmetic success of the trimming operation. Even if every slat were perfectly flat and perfectly dimensioned for the tool, a zero degree tangent to the retaining edges would be undesirable because this would require, immediately before achieving the zero degree tangency, that an infinitely thin slice of the slat be sheared. The dies could not obtain a sufficient bite to accomplish such a fine shearing operation, and resultingly a burr would be formed at the point where the shearing operation ceased. Another problem with a zero radius at the corners is that slats commonly do not flatten perfectly to fill the entire distance between retaining edges, resulting in one of the corner curves being slightly truncated. If one corner curve is substantially perfect and the other is truncated, the contrast is evident and is cosmetically unacceptable. By employing a five degree tangent at the corners, even a fully cut corner curve is slightly truncated, and variation that might occur in the opposite corner curve has been found to be quite unnoticeable.

The tool 10 is thus able to consistently and accurately produce a uniform shearing action with a constant shear angle between cooperating die cutting edges. The parallel action of the two dies is achieved with a conventional parallel-action handle assembly, with the addition of guide pins and a resilient compression spring between them, all aligned along the longitudinal tool axis, substantially coaxial with the cutting edges 54 and 64 of the dies. This arrangement preserves the desired alignment between dies for accurate cutting and prevents binding in the relative die movements during opening and closing of the tool. The specific contour of the cutting edges as applied to a venetian blind trimmer takes advantage of the necessary imperfection in curved corner contours to avoid burrs and to cosmetically match slightly imperfect corner curves.

Other types of die cutting tasks may be accomplished by modification of the die configuration. For example, the tool may serve as a punch, in which case the guide pins and compression spring would be centrally aligned with male and female punching dies.

The description provided should be understood to be by way of example and not limitation. Changes in details of construction might be made without departing from the objects of the invention. Therefore, the scope of the invention is to be construed by reference to the following claims.

I claim:

1. A parallel action die cutting hand tool having a parallel action handle of the kind employing a pair of scissors-action handle levers pivoted on a transverse axis, each of the levers having a pivot pin both longitudinally to the rear and longitudinally to the front of the pivot axis and parallel thereto, the pivot axis and the pivot pins being normal to the plane of the parallel action handle, comprising:

(a) first and second die cutting jaws connected to the parallel action handle by engagement of the pivot pins, each jaw connected to a front pivot pin of one handle lever and a rear pivot pin of the opposite handle lever in corresponding pivot pin receiving openings in each jaw, at least one of the openings being longitudinally elongated;

(b) at least front and rear guide pins extending between said die cutting jaws and slidable with respect to at least one of the jaws, the pins being longitudinally spaced apart, each near a pivot pin and lying in the plane of the parallel action handle approximately in longitudinal alignment with the cutting edges of the jaws; and (c) at least one compression member connected between the die cutting jaws for biasing the jaws to separated position and located longitudinally between said guide pins.

2. The tool of claim 1, wherein said front guide pin is located forwardly of the front pivot pin and the rear guide pin is located forwardly of the rear pivot pin.

3. The tool of claim 2, wherein said compression member is located forwardly of the handle pivot axis.

4. The tool of claim 1, wherein each of said die cutting jaws has a rearward portion adapted for connection to the parallel action handle and a forward portion having cutting edges, the opposed surfaces of the rearward portion being substantially parallel for supporting the jaws in parallel alignment at maximum closure, at least one of the jaws having a recess formed therein for reception of the compression member, and wherein the guide pins are located near opposite longitudinal ends of the rearward portion.

5. The tool of claim 1, adapted for trimming the end of a slat of sheet material to be joined by a curved corner to at least a front or rear edge of the slat, wherein one of said first and second jaws comprises a die plate for supporting the slat during cutting and having a retaining edge associated therewith for aligning at least one edge of the slat in predetermined position with respect to the die plate, said die plate having a cutting edge for trimming the end of the slat when so aligned, the cutting edge having a curved corner meeting said retaining edge at a tangent angle of substantially at least three degrees.

6. The tool of claim 5, wherein said tangent angle is between three and seven degrees.

7. The tool of claim 5, wherein said tangent angle is substantially five degrees.

8. The tool of claim 5, adapted for trimming the end of a slat of sheet material to be joined by curved corners to both front and rear edges of the slat, comprising both front and rear retaining edges associated with said die plate for containing the front and rear edges of the slat therebetween with at least one of the slat edges aligned in predetermined position with respect to the die plate, and having a curved corner joining said cutting edge to each of the retaining edges at a tangent angle of substantially at least three degrees.

9. The tool of claim 8, wherein said tangent angle is between three and seven degrees.

* * * * *